United States Patent [19]

Starozik

[11] Patent Number: 5,654,525
[45] Date of Patent: Aug. 5, 1997

[54] CONDUIT CONNECTOR

[75] Inventor: Kevin Starozik, Calgary, Canada

[73] Assignee: Starozik Industries Ltd., Calgary, Canada

[21] Appl. No.: 290,144

[22] Filed: Aug. 15, 1994

[51] Int. Cl.[6] .................................................. H02G 3/04
[52] U.S. Cl. ..................... 174/49; 174/58; 285/154.1
[58] Field of Search .................................. 174/48, 49, 50, 174/58; 220/3.8; 285/175, 49; 138/103, 109, 155, 178; 392/365, 366, 367, 368, 369

[56] References Cited

U.S. PATENT DOCUMENTS

| | | | |
|---|---|---|---|
| 193,810 | 8/1877 | Ecceleston | 285/175 X |
| 1,211,973 | 1/1917 | Slater et al. | 392/368 X |
| 1,624,438 | 4/1927 | Scott | 220/3.8 |
| 1,900,956 | 3/1933 | Somersall | 392/368 X |
| 2,620,081 | 12/1952 | Lear, Jr. | 220/3.8 |
| 2,859,984 | 11/1958 | Thomas | 285/175 X |
| 2,906,152 | 1/1959 | Brase | 285/175 X |
| 2,954,419 | 9/1960 | Bolef et al. | 174/48 |
| 3,110,754 | 11/1963 | Witort et al. | 174/49 X |
| 4,248,459 | 2/1981 | Pate et al. | 285/49 X |
| 5,354,952 | 10/1994 | Hickey | 174/48 |

Primary Examiner—Kristine L. Kincaid
Assistant Examiner—Dean A. Reichard

[57] ABSTRACT

An electrical conduit is reverse-threaded on its opposite ends. A junction box may be supported by at least two conduits, one of which is reverse threaded to provide for positional adjustability and clamping of the conduits in place.

6 Claims, 3 Drawing Sheets

CONDUIT CONNECTOR

FIELD OF THE INVENTION

This invention relates to a form of threaded conduit system. More specifically, the conduit connectors of the invention are particularly suited for use in explosion-proof environments wherein electrical wire must be isolated from a flammable atmosphere.

BACKGROUND TO THE INVENTION

Electrical conduit is normally coupled by sleeve couplings. Where threaded couplings are employed, they are customarily threaded for a single direction of rotation, e.g. right-hand threading. Reverse threading is known, as for use in turn buckles. The use of right hand and left-hand threading in conduits, particularly in an explosion-proof environment for the purpose of locating and supporting parts, is believed not to have been previously contemplated.

U.S. Pat. No. 4,454,376 is of interest as it shows an electrical connector with reverse threads at each end. This is not however, the same as a conduit, and not a conduit that serves to support other parts. It is, therefore, not in the class of the present invention.

Threaded couplings are used for electrical conduit in explosion-proof equipment because it has been established that a series of consecutive threads provides a flame path of adequate length and/or gap to serve as a barrier against the propagation of a flame. Thus if a flammable gas is ignited by an electrical spark within a conduit, the resulting flame cannot spread to the outer atmosphere.

For explosion-proof electrical equipment, it is typically necessary to run conductors from one location to another. It is also desirable to provide junction boxes for the joining of conductors. When such a junction box is mounted externally, the conductors leading to it must be contained within conduits.

This invention is particularly suited to the coupling of conduit leading to a junction box in such an environment.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

The invention in its most general aspect is based on an electrical conduit for carrying conductors between two components on a piece of equipment, the conduit having opposed threads on its respective ends to allow for distance adjustability between such components.

More particularly, an electrical junction box may be supported from other apparatus by two or more electrical conduits extending respectively from two or more locations on such apparatus, the conduits being thread-coupled at both of their ends to engage respectively at one end with such apparatus and at the other end with the junction box, at least one of such conduits being reverse-threaded by having opposed threading at its respective ends.

By use of opposed threading at the ends of at least one of such conduits, the junction box can be drawn into a preferred position where it is rigidly supported by the conduits with respect to the apparatus. By developing a binding action within the threaded couplings, the self-rigidifying system of the invention is particularly suited to providing structural support when vibrations are present, such as in a fan-equipped explosion-proof heater.

Optionally, two or more supporting conduits may be reverse-threaded.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
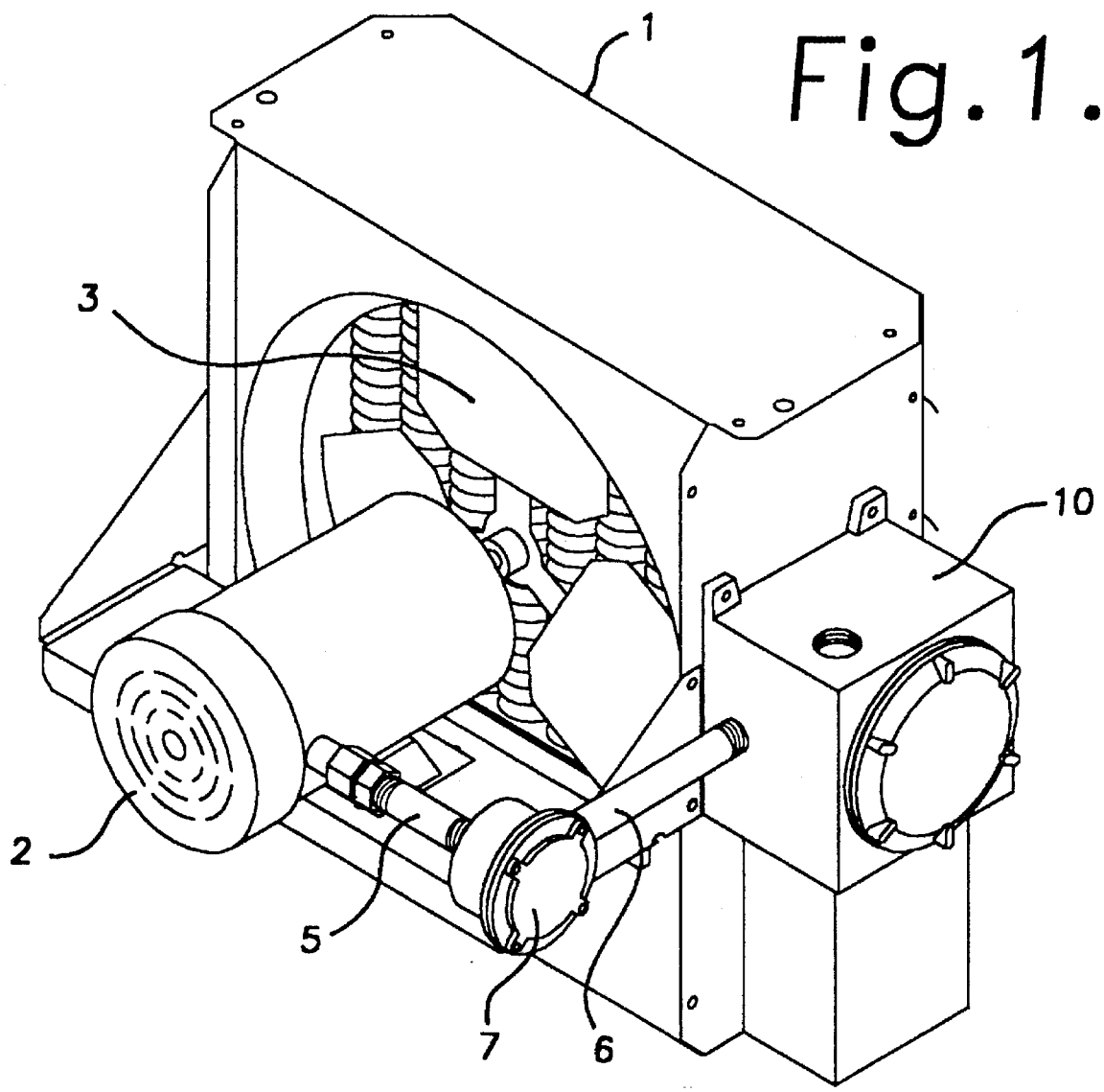
FIG. 1 is a perspective view of an explosion-proof heater with a cantilever-supported electrical junction box.

In FIG. 1 an explosion-proof heater 1 having a fan motor 2 and fan 3 is depicted. The fan motor 2 is provided with electrical power by electrical wires (not shown) passing through conduits 5, 6 and a junction box 7. The junction box 7 allows the necessary connections for the motor wires to be effected.

Figure 2:
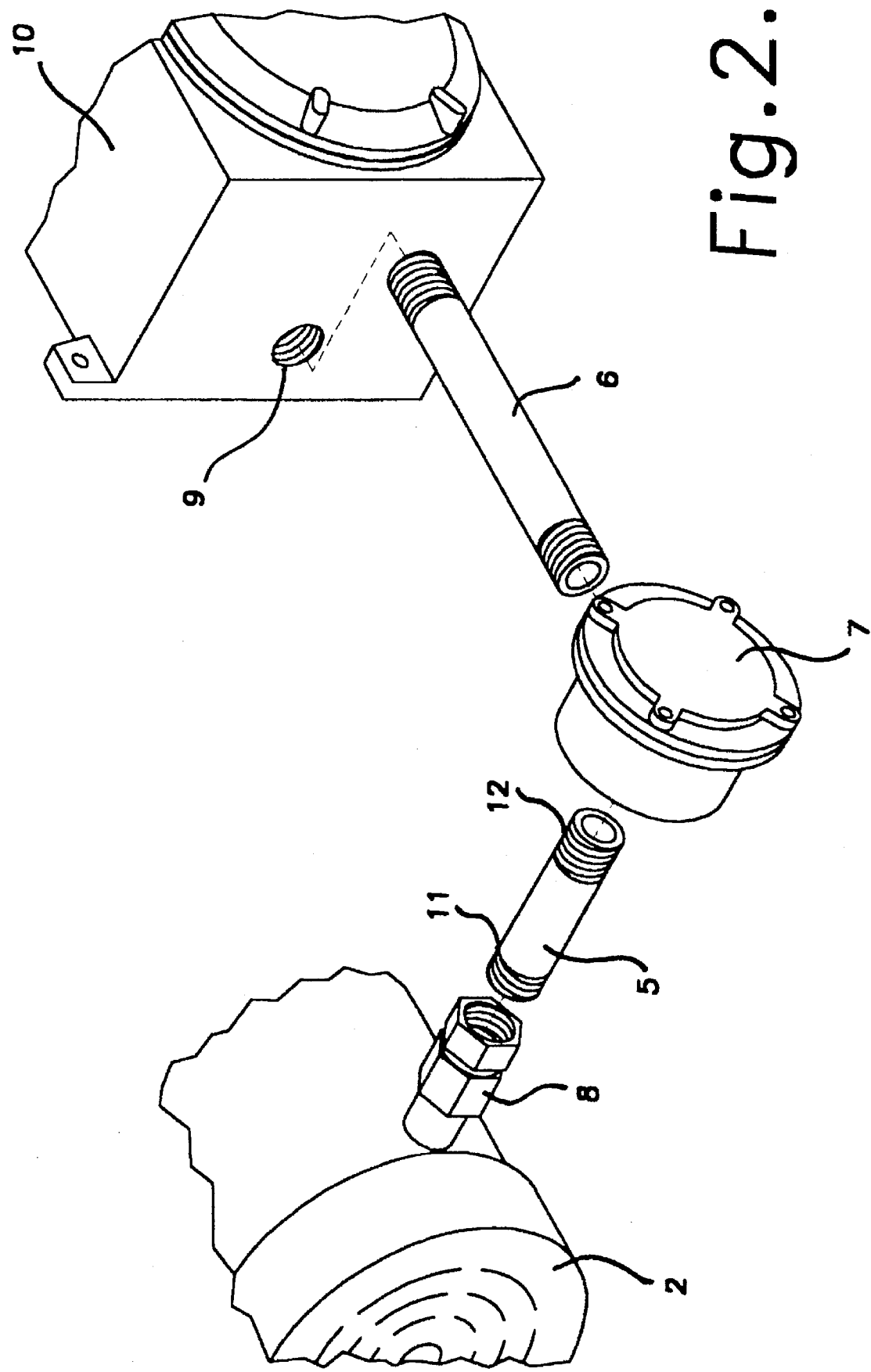
FIG. 2 is a perspective, exploded, close-up view of the junction box and supporting conduits of FIG. 1.

In FIG. 2, the junction box 7 is shown as it is about to be installed by being attached to the motor 2 by a first conduit 5, and to the main electrical box 10 by a second conduit 6. If the motor has a male coupling, then a standard, threaded male-to-female converter coupling 8 may be employed.

The hole 9 on the main electrical box 10 of the heater 1 for receiving the second conduit 6 can also be seen before the second conduit 6 is installed. The junction box 7 is shown positioned outwardly of its final position in FIG. 2, with portions of the threads 11, 12 on the conduit 5 exposed. The threaded ends of conduit 5, and optional conduit 6, are reverse-threaded.

For assembly, junction box 7 is aligned with hole 9 and then mounted on the conduit 6 which connects to the main electrical box 10. Due to opposed threading on the ends of the second conduit 6, the rotation of this conduit in the appropriate direction will cause its threaded ends to simultaneously engage at its respective ends with the hole 9 and junction box 7. Then conduit 5 is engaged between the motor 2 and junction box 7. The motor 2, at this stage, is loosely mounted to provide room to insert the conduit 5. As the conduit 5 is rotated in the appropriate direction, the presence of an opposed left-hand thread at one end 11 and the standard right-hand thread 12 at the other end causes the motor 2 to be drawn towards the junction box 7.

While the preferred embodiment is premised on both conduits being reverse threaded, only one need be so formed. Thus conduit 6 may be normally threaded and conduit 5 reverse-threaded to allow the junction box to be adjusted in at least one direction, and "fixed" in place in the manner next described.

Figure 3:
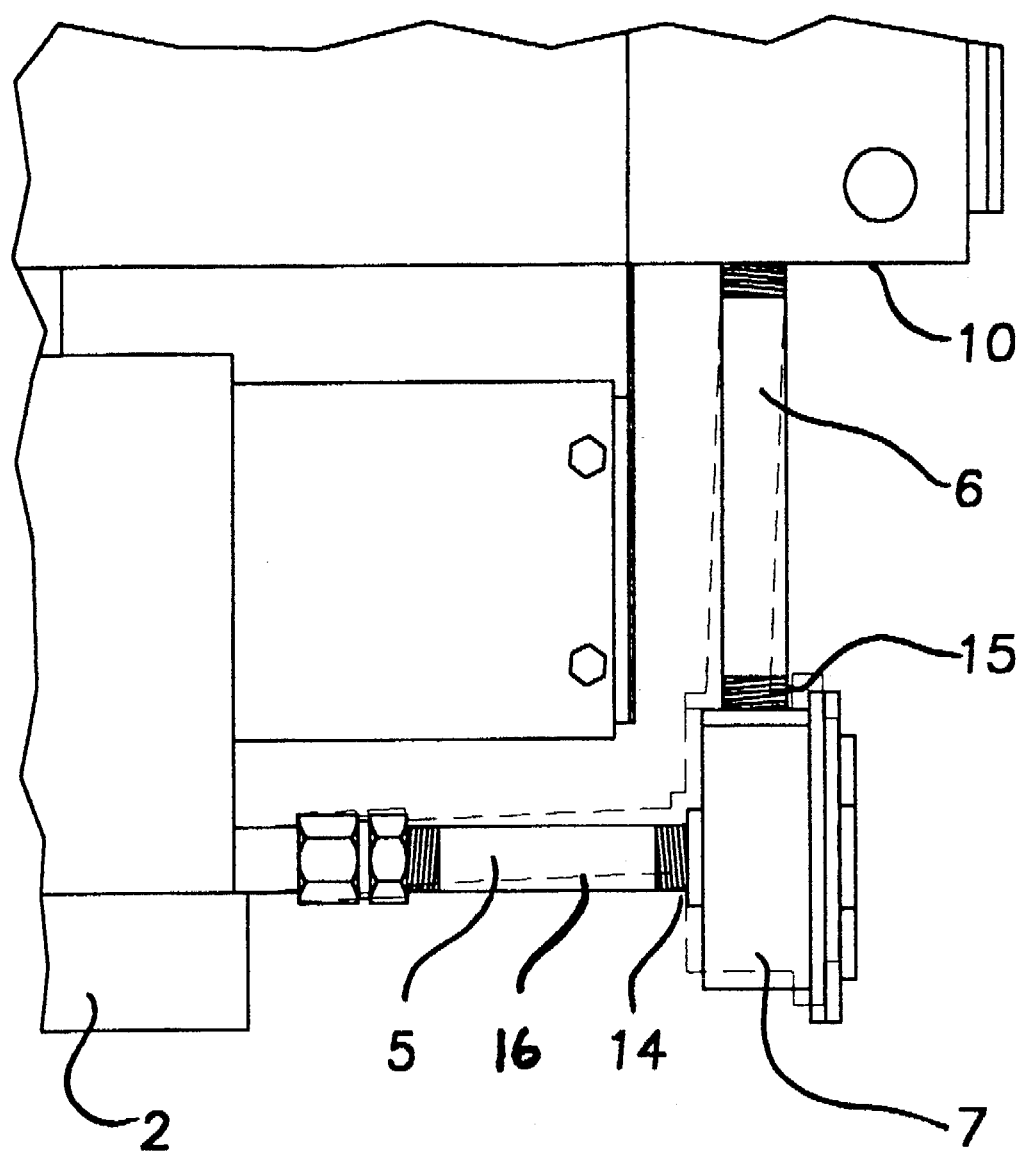
FIG. 3 is a plan view of the junction box with two conduits supporting it in place.

Turning to FIG. 3, the junction box 7 may be seen to be supported by the two conduits 5, 6 with an approximately square, natural alignment between the conduits 5, 6. "Natural alignment" means that the threaded joints are axially aligned for easy rotation, with minimal friction. It will be apparent that further rotation of either or both of the conduits 5, 6 will produce a tendency to form a trapezoidal-like configuration in which the joints will depart from natural alignment. This is shown by the dotted outline 16 in FIG. 3.

As the conduits 5, 6 progressively engage additional thread lengths (sufficient to meet flame barrier standards) and the geometry of the conduits departs from natural alignment, then the joints 14, 15 where the conduits 5, 6 enter the junction box 7 will develop a lateral twist. This twist will increase friction within the joints 14, 15 and stiffen the support being provided to the junction box 7. In such conditions these threaded joints will be effectively locked in place and have a reduced tendency to loosen under vibration.

While two conduits are shown as supporting the box, more may also be employed.

From this it will be seen that a combined mechanism has been provided employing opposite threaded conduit lengths for installing, locating and adjusting a junction box and supporting it in a cantilevered manner that resists loosening when subjected to vibration.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property of privilege is claimed are defined as follows:

1. An electrical junction box supported from other apparatus by at least two electrical conduits extending respectively from at least two locations on such other apparatus, at least one of said at least two electrical conduits being a reverse-threaded conduit that is thread-coupled at its ends through threaded joints to engage respectively at one end with said apparatus and at the other end with complementary threaded couplings on said junction box, the ends of said at least one reverse-threaded conduit being:

(1) oppositely threaded at the respective ends of said at least one reverse threaded conduit to provide adjustability in the positioning of said junction box; and (2) rotationally adjusted to produce misalignment in said threaded joints to thereby stiffen the support of said junction box.

2. An electrical junction box as in claim 1 wherein the at least one reverse-threaded conduit comprises two reverse-threaded conduits each with oppositely threaded ends, said two reverse-threaded conduits providing the only support for said junction box through respective threaded joints.

3. An electrical junction box as in claim 2 wherein said two reverse-threaded conduits are rotationally adjusted to produce misalignment within their respective threaded joints to thereby stiffen the support of said junction box.

4. An electrical junction box as in claim 1 in combination with an explosion-proof electrical heater having a fan that is operated by an electrical motor, said junction box and conduits carrying conductors to supply electrical power to said motor.

5. An electrical junction box as in claim 2 in combination with an explosion-proof electrical heater having a fan that is operated by an electrical motor, said junction box and conduits carrying conductors to supply electrical power to said motor.

6. An electrical junction box as in claim 3 in combination with an explosion-proof electrical heater having a fan that is operated by an electrical motor, said junction box and conduits carrying conductors to supply electrical power to said motor.

* * * * *